United States Patent [19]

Dennison

[11] Patent Number: 5,057,669
[45] Date of Patent: Oct. 15, 1991

[54] TEMPERATURE CONTROL CIRCUIT HAVING SERIES CONNECTED FAIL-SAFE CONTROL

[75] Inventor: Richard L. Dennison, Burnsville, Minn.

[73] Assignee: Minnesota Mining and Manufacturing Company, St. Paul, Minn.

[21] Appl. No.: 471,380

[22] Filed: Jan. 29, 1990

[51] Int. Cl.$^5$ .............................................. H05B 1/02
[52] U.S. Cl. .................................. 219/501; 219/505; 219/497; 323/236; 307/647
[58] Field of Search ............... 219/501, 497, 494, 505, 219/504, 499, 508, 509; 307/117, 647, 230; 323/235, 236

[56] References Cited

U.S. PATENT DOCUMENTS

| | | | |
|---|---|---|---|
| 3,413,438 | 11/1968 | Gardner et al. | 219/501 |
| 3,842,243 | 10/1974 | Gregory | 219/497 |
| 4,278,872 | 7/1981 | Koether et al. | 219/497 |
| 4,546,239 | 10/1985 | Sugimori | 219/497 |
| 4,736,091 | 4/1988 | Moe | 219/497 |
| 4,816,642 | 3/1989 | Dennison | 219/230 |

OTHER PUBLICATIONS

Motorola Semiconductors, Semiconductor Description Brochure, CA 3059 and CA 3079 (6 pages) (1977).

*Primary Examiner*—Mark H. Paschall
*Attorney, Agent, or Firm*—Gary L. Griswold; Walter N. Kirn; Walter C. Linder

[57] ABSTRACT

An improved temperature control circuit having a controller portion with an inhibit input and a temperature responsive circuit portion that includes a resistive portion connected in series with a sensor portion which establishes the control point for the control circuit, the improvement including a semiconductor switch in series with the sensor portion, the semiconductor switch having two electrodes between which a resistor is connected. The resistor is also connected to the inhibit input of the controller to present a signal to inhibit operation of the temperature control circuit when the sensor portion and semiconductor switch is not conducting.

5 Claims, 1 Drawing Sheet

TEMPERATURE CONTROL CIRCUIT HAVING SERIES CONNECTED FAIL-SAFE CONTROL

FIELD OF THE INVENTION

The invention presented herein relates to temperature control circuitry and in particular to circuitry for the detection of an open circuit in the temperature responsive circuit portion of the control circuitry with such detection providing a control signal usable for terminating operation of the temperature control circuitry.

BACKGROUND OF THE INVENTION

U.S. Pat. No. 4,816,642 to Richard L. Dennison, the inventor of the invention presented herein, discloses a temperature control circuit that includes a triac heater control integrated circuit (IC) portion that is commercially available from Motorola, Inc., Phoenix, Ariz. under Motorola's type designation CA 3059 and CA 3079. The CA 3059 and CA 3079 are referred to as zero voltage switches and are similar except that the CA 3059 also has a protection circuit and an inhibit input. The application literature for the CA 3059 and CA 3079 circuits refers to such inhibit input as providing an "external inhibit function." An input of at least 1.2 volts at 10 microamperes is indicted in the application literature as effective "to remove current drive from the thyristor." As noted in U.S. Pat. No. 4,816,642 (supra) the protection circuit of the CA 3059 circuit is subject to several design constraints which precludes its use for a multi-temperature control application.

There is a need for termination of the operation of a temperature control circuit that is controlled by a temperature responsive circuit portion in the event an open circuit occurs in the temperature responsive circuit portion. If such termination protection is absent, an operation of the circuit with such an open circuit could lead to the production of damaging temperatures or create a personnel safety hazard. If the temperature control circuit disclosed in U.S. Pat. No. 4,816,642 (supra), is used for the control of the temperature of a hot melt adhesive applicator, a high uncontrolled temperature is produced if the temperature sensing element of the circuit "opens". It has been the practice to use a thermal fuse in the power line to the heating element of such an applicator which will open when the temperature of the heated block in the applicator reaches approximately 700° F. Such a protection approach protects the operator, but not the applicator. More protection is needed than that which is afforded by the use of a thermal fuse with a temperature control circuit in an hot melt adhesive applicator that employs an adhesive cartridge. The uncontrolled temperature levels created before the thermal fuse opens, when an "open" occurs in the temperature responsive circuit portion, could cause the adhesive cartridge to burst creating a personnel safety hazard. In cases where the applicator is designed to operate at only one controlled temperature level, the CA 3059 zero voltage switch device could be used to provide the desired protection as the protection circuit in such device is designed to provide protection when the temperature sensor that is used with such a single control temperature application opens or shorts. However, as mentioned above, the protection circuit of the CA 3059 Motorola zero voltage switch can not be used when it is used for multi-temperature applications.

While the application literature for the Motorola device describes the characteristics of the external signal needed to activate the inhibit function that would inhibit operation of a temperature control circuit, the application literature is silent as to how such a signal can be obtained and applied to the inhibit input of the device in the event the temperature sensor for such circuit presents an open. Further, since the Motorola device (CA 3059) has a protection circuit, the use of the inhibit input based for circuit protection upon the occurrence of such an "open" is not even contemplated.

SUMMARY OF THE INVENTION

The invention presented herein provides a solution to the need for circuitry in a temperature control circuit to produce a signal that is usable to terminate or inhibit operation of the temperature control circuit when an "open" is present in the temperature responsive circuit portion of the control circuit. The invention is embodied in an improved temperature control circuit that has a controller portion with an inhibit input, which, upon receiving a signal, inhibits operation of the control circuit, the control circuit also having a temperature responsive circuit portion that includes a resistive portion connected in series with a sensor portion, the connection common to the resistive portion and sensor portion presenting a signal when the control circuit is energized that is applied to the controller for establishing the operating control point for the control circuit, the improvement including: a semiconductor switch connected in series with the sensor portion, the semiconductor switch conducting so long as there is current flow via the sensor portion; and an impedance connected to the semiconductor switch and to the inhibit input of the controller, the impedance presenting a signal to the inhibit input, when the semiconductor switch is not conducting, that is effective to inhibit the operation of the temperature control circuit.

BRIEF DESCRIPTION OF THE DRAWINGS

The novel features and advantages of the present invention will become more apparent to those skilled in the art upon consideration of the following detailed description which refers to the accompanying drawings wherein.

DETAILED DESCRIPTION

Figure 1:
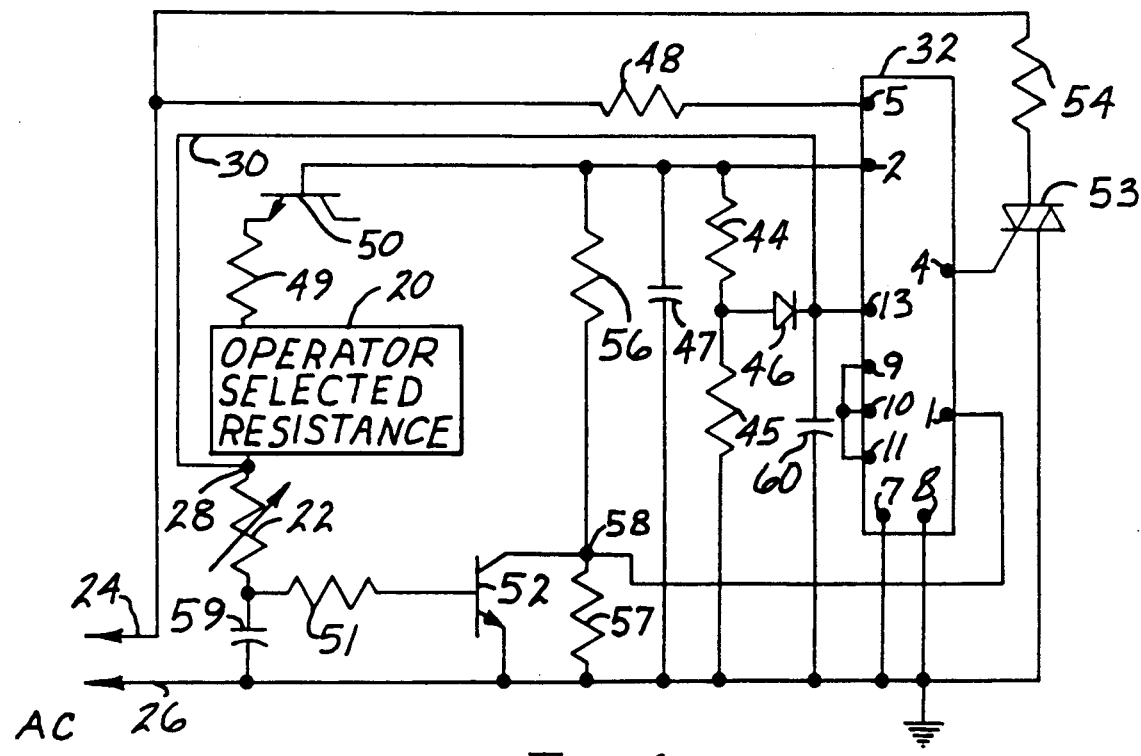
FIG. 1 is a schematic of control circuitry embodying the invention.

Referring to FIG. 1 of the drawing, a schematic circuit of a temperature control circuit which embodies the invention presented herein is shown. The control circuit can be adjusted for various temperature control points via a temperature responsive circuit portion that has resistance values provided at 20 in the circuit, which can be selected by the operator for the selection of various temperature control points. The temperature responsive circuit portion also includes a sensor portion having a sensing element 22, which has a negative temperature coefficient of resistance, connected in series with the operator selected resistance 20. The sensing element 22 is positioned for sensing the temperature to be controlled. When the circuit is energized from an A.C. source via conductors 24 and 26, a voltage will be present at the common connection 28 for the operator selected resistance 20 and the sensing element 22. This voltage is applied via conductor 30 to a connecting point 13 of controller 32 shown in block diagram form that can be provided by a zero voltage switch.

Figure 2:
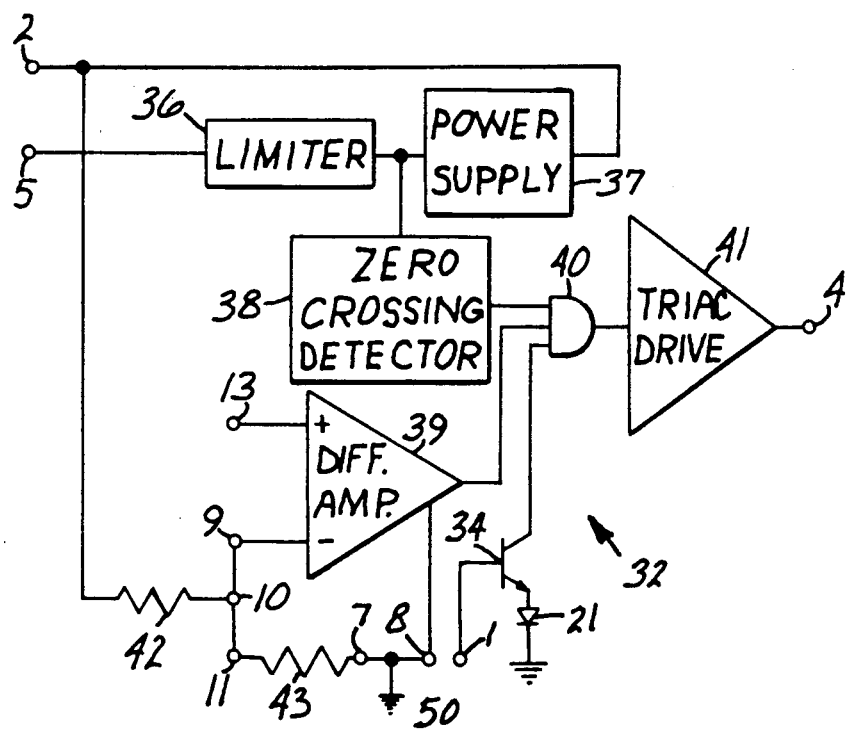
FIG. 2 is a block diagram of a portion of the circuitry of FIG. 1.

Referring to FIG. 2, circuitry for a zero voltage switch, that is used for the controller 32 in the circuitry of FIG. 1, is shown in block diagram form. It is commercially available under the designation CA 3059 from Motorola, Inc., P.0. Box 20912, Phoenix, Ariz. 85036. The connecting points indicated by reference numerals 1, 2, 4, 5, 7-11 and 13 correspond to the reference numerals used in the application literature published by Motorola, Inc. for the CA 3059 zero voltage switch. The zero voltage switch is shown in block diagram form in FIG. 2. It includes a limiter 36 and power supply 37 that allows the circuitry to be operated directed from an A.C. source. The A.C. source is applied between connecting point 5 for limiter 36 and ground at 50 to which connecting points 7 and 8 are connected. The output of power supply 37 provides about 6.5 volts D.C. to connecting point 2. The circuitry of FIG. 2 also includes a zero crossing detector 38, a differential amplifier 39, an AND circuit 40, a triac drive 41 and two resistors 42 and 43. The zero crossing detector is connected between one input of the AND circuit 40 and the connection common to the limiter 36 and power supply 37 serving to provide a signal at each zero crossing of the A.C. supply. The differential amplifier 39 has its output connected to a second input of the AND circuit 40 to supply a signal to the AND circuit whenever the positive input of the differential amplifier, which connects with connection point 13, is positive relative to the negative input of the operational amplifier. The negative input of operational amplifier 39 has a positive voltage presented to it via the connecting point 9, which is also connected to connecting points 10 and 11. Resistors 42 and 43 present a resistance of 10 K and 9.6 K ohms, respectively, and are connected in series between ground 50 and the output 2 of the power supply 37 to form a voltage divider. The positive voltage present across resistor 43 is presented to the negative input of the differential amplifier 39. The AND circuit 40 also has an input that is connected to connecting point 1 for the switch 32 via the collector and base electrodes of a transistor 34, the emitter electrode thereof being connected to ground via a diode 21. The base of the transistor 34 is connected to the connecting point 1. The application literature published by Motorola, Inc. indicates a signal to connecting point 1 of at least +1.2 volts at 10 microamperes will cause any current drive at connecting point 4 to be discontinued. Such literature, however, does not suggest how such a signal can be obtained in connection with any circuit with which the zero voltage switch 32 might be used.

Returning to FIG. 1, the connecting point 4 of the zero voltage switch 32 is the output of the triac drive 41 (FIG. 2) and is used to control the operation of an electronic switch. In the case of the circuitry of FIG. 1, a triac (bidirectional triode thyristor) 53 provides the electronic switch. Output 4 of the zero voltage switch 32 is connected to the gate electrode of the triac. One side of the triac 53 is connected to the A.C. power via a resistive heating element 54. The other side of the triac 51 is connected to the ground reference 50 of the circuit that is provided by conductor 26. Accordingly, when the circuitry is connected to an A.C. power source, a current path is established that includes the heating element 54 and the triac 53 with the heating element 54 energized for each half cycle of the A.C. source provided the triac has received a gating pulse from the output 4 of the triac drive 41, which will occur at each zero crossing of the A.C. source, and provided the differential amplifier 39 of circuit 32 is also then providing an output signal to the AND circuit 40 of the circuit 32.

In addition to the circuit elements mentioned, additional circuitry is shown in FIG. 1 which permits use of the zero voltage switch 32 available from Motorola, Inc. for temperature control that provides for the selection by the operator of a number of temperature control points is described in U.S. Pat. No. 4,816,642 (supra). Such additional circuitry includes series connected resistors 44 and 45 with resistor 44 connected to connecting point 2 and resistor 45 to conductor 26. The connection common to resistors 44 and 45 is connected to connecting point 13 of the zero voltage switch 32 via a diode 46. A capacitor 47 connected between connecting point 2 and ground 50 is provided as an output filter capacitor for the power supply 37 of the zero voltage switch 32. A current limiting resistor 48 is connected between the power supply conductor 24 and the connecting point 5.

If the operator selected resistance 20 were considered to be connected directly to the connecting point 2 rather than via the resistor 48 and the emitter-base of transistor 50 and with the sensing element connected directly to conductor 26 rather than via the resistor 51 and the base-emitter of transistor 52, the circuitry described to this point will operate in accordance with the functional block diagram shown in the application literature (DS9450) provided for the Motorola, Inc. CA 3059 and CA 3079 zero voltage switch. When the resistance presented by the sensing element 22, which has a negative temperature coefficient, is larger than the resistance presented by operator selected resistance 20, a voltage signal is presented to the positive input 13 of the operational amplifier 39 which causes the input 13 to be more positive than the positive voltage provided at the negative input 9 of the operational amplifier. This causes the operational amplifier 39 to provide an input signal to the AND circuit 40 which, when the zero crossing detector 38 produces a pulse at the beginning of each half cycle of the A.C. input to the circuitry, produces an output signal that causes the triac drive 41 to operate to turn the triac 53 on. The triac 53 is thus turned on every half cycle of the A.C. until the heat generated due to current flow through the heating element 54 causes the temperature sensed by the sensing element 22 to rise to cause the resistance of the sensing element 22 to be reduced to a point where the voltage present across sensing element 22 is no longer more positive than the voltage provided to the negative input 9 of the operational amplifier 39. The output from the operational amplifier 39 for the AND circuit 40 is, therefore, terminated so the triac 53 remains off for each half cycle of the A.C. for as long as such condition exists. As the temperature sensed by the sensing element 22 drops (since current flow through the heating element ceases when the triac is off) the resistance of the sensing element 22 increases causing the signal to the input 13 of the operational amplifier to increase sufficiently to again provide an output which results in the triac 45 being turned on at the beginning of each half cycle causing the heater element to be energized to raise the temperature sensed by the sensing element 23 to a point where the triac is again turned off.

The two resistors 44 and 45 plus the diode 46, which are not used in the circuitry disclosed in the Motorola, Inc. application literature for the CA 3059 and CA 3079 zero voltage switch, are provided to allow the operator to select the resistance at 20 for a lower temperature setting at a time when the control is operating to maintain a higher temperature control point. Without the aforementioned resistors 44 and 45 plus the diode 46, the operation just mentioned would cause the input 13 of the operational amplifier 39 to be sufficiently negative with respect to the negative input 9 to cause the operation amplifier to produce an output signal to cause the triac 53 to be turned on the present a run away condition. The use of such resistors and diode are disclosed in greater detail in U.S. Pat. No. 4,816,642 (supra). The capacitor 60 connected between conductor 26 and connecting point 13 of the zero voltage switch 32 is provided as a filter.

Circuitry that has been described to this point has been used for controlling the operating temperature of a hot melt adhesive applicator. Protection of the applicator from damage due to a high uncontrolled temperature that can be produced if the sensing element 22 presents an "open" has been provided by the use of a thermal fuse placed in the line to the heating element 54 which is positioned to open when heated block in the applicator reaches approximately 700° F. While such an approach provides protection for the applicator, it fails to provide protection to the operator when an applicator of this type uses hot melt adhesives that are dispensed from a cartridge since the cartridge may burst when such high temperatures are produced creating a potential personnel safety situation.

The invention presented herein provides a solution to this problem in that it provides a way for providing a signal to the inhibit connecting point 1 of the zero voltage switch 32 to effect termination of current flow through the heating element 54 when no current flows through the sensing element 22. The solution includes the use of the transistor 52 described earlier which has its emitter electrode connected to the sensing element 22 via a resistor 51. The collector electrode of the transistor 52 is connected via a resistor 56 to the pin connector 2 at which the D.C. power provided by the zero voltage switch 32 is provided. The solution to the "open" circuit problem also includes the resistor 57 wherein the one end of resistor 57 is connected to the collector electrode of transistor 52 with its other end connected to conductor 26. The connection 58 that is common to the resistors 56 and 57 is connected also to the collector and to the inhibit pin connector 1 of the zero voltage switch 32. As can be seen the resistors 56 and 57 provide a voltage divider so the connection 58 provides a signal to the zero voltage switch 52 via the inhibit pin connection 1 when transistor 52 is not conducting to terminate conduction of the triac 53 and therefore current flow through the heating element 54. The transistor 52 will, of course, not conduct when there is an "open" in the sensing element 22 or in any element that is in series with the sensing element 22. So long as transistor 52 is conducting, the voltage signal at connection 58 is limited to the voltage drop across the collector and emitter electrodes of transistor 52 which is not great enough to inhibit operation of the triac 53 via the inhibit pin connection 1 of the zero voltage switch 32.

The resistor 51 connected to the base of transistor 52 is needed in the event the sensing element 22 is shorted for some reason. Without the resistor 51 a shorted sensing element 22 would result in a voltage at pin 13 of the zero voltage switch 32 that is sufficiently low with respect to the voltage at connecting pin 9 of the zero voltage switch to cause the triac 53 to conduct. By adding resistor 51, the voltage presented to pin 13 of the zero voltage switch 32 by the resistors 44 and 45 and diode 46 is raised, when there is a shorted sensing element 32, to a level where it is not sufficiently less than the voltage at connecting pin 9 to cause the triac 53 to conduct nor sufficiently high enough to cause triac 53 to be turned on by the zero voltage switch 32.

It can be appreciated that the resistor 51 and the base-emitter junction of transistor 52 introduces an offset which must be corrected in the operator selected resistance portion of the temperature responsive portion of the circuit. This can be corrected by connecting the base-emitter of a transistor 50 that is of the same type as transistor 52 and a resistor 49 of the same value as resistor 51 in series between the operator selected resistance 20 and the connecting pin 2 for the power supply of the zero voltage switch 32. Using this solution to the offset problem created by the use of transistor 52 and resistor 51 allows the same operator selected resistance 20 arrangement for a control circuit that requires the same temperature selective points and does not use the inhibit connecting point 1 of the zero voltage switch 32. Rather than introduce the additional resistor 51, the resistor used in the operator selected resistance portion for the highest desired temperature control point can be replaced with a resistor that has a resistance value equal to the sum of the resistance for such control point plus the resistance value of resistor 51.

The introduction of the transistor 52 into the circuitry causes the circuitry to be sensitive to various transient and noise signals that might be picked up or be initiated as different temperature settings are selected. This problem is solved by the use of the capacitor 59 that is connected across the resistor 51 and the base emitter of transistor 52 which serves to filter out such signals.

A control circuit embodying the invention presented herein and using the circuit components and values, as set forth below, will provide operation from a 120 volt A.C. source for temperature control at the temperature indicated.

| Selected Resistance 20 plus Resistance 49 | Temperature Control Point |
|---|---|
| 2.55K ohms | 241° C. |
| 3.68K ohms | 216° C. |
| 4.92K ohms | 199° C. |
| 7.19K ohms | 179° C. |
| 17.55K ohms | 143° C. |
| 28.05K ohms | 127° C. |
| 79.35K ohms | 93° C. |

| Component | Value or Type |
|---|---|
| Zero Voltage Switch 32 | CA 3059 (Motorola) |
| Triac 53 | MOT 15A-8 |
| Transistor 50,52 | NPN,MOT Type MPS 6515 |
| Sensing element 22 | 2 NTC Thermistors, each 500,000 at 25° C. (Fenwal) |
| Heating Element 54 | 26 ohm Nichrome wire resistor |
| Resistor 44,45 | 1.8K ohm |
| Resistor 48 | 7.5K ohm, 5 watt |
| Resistor 51 | 634 ohm |
| Resistor 56 | 68K ohm |
| Resistor 57 | 120K ohm |
| Capacitor 47 | 200 µf @ 16v DC, electrolytic |
| Capacitor 59 | 6.8 µf @ 6v DC, tantalum |
| Capacitor 60 | .1 µf @ 50v DC |

| | |
|---|---|
| Diode 46 | IN4001 or IN4002 |

The particulars of the foregoing description are provided merely for purposes of illustration and are subject to a considerable latitude of modification without departing from the noval teachings disclosed therein. Accordingly, the scope of this invention is intended to be limited only as defined in the appended claims, which should be accorded a breadth of interpretation consistent with this specification.

I claim:

1. An improved temperature control circuit that has a controller portion with an inhibit input, which, upon receiving a signal, inhibits operation of the control circuit, the temperature control circuit also having a temperature responsive circuit portion that includes a resistive portion connected in series with a sensor portion, the connection common to the resistive portion and sensor portion presenting a signal when the control circuit is energized that is applied to the controller for establishing the operating control point for the control circuit, the improvement comprising:

a semiconductor switch connected in series with the sensor portion, said semiconductor switch having a collector and an emitter, said semiconductor switch conducting so long as there is current flow via the sensor portion; and an impedance connected between said collector and said emitter of said semiconductor switch and to the inhibit input of the controller, said impedance presenting a signal to the inhibit input, when said semiconductor switch is not conducting, that is effective to inhibit the operation of the temperature control circuit.

2. An improved temperature control circuit according to claim 1, wherein said temperature responsive circuit portion includes an impedance connected in series with said resistive portion that is equal to the impedance presented in series with said sensor portion by said semiconductor switch.

3. An improved temperature control circuit according to claim 1, wherein said semiconductor switch is a transistor having a base electrode, said base electrode being connected to said sensor portion.

4. An improved temperature control circuit according to claim 3, wherein said base electrode and emitter are connected in series with said sensor portion and said temperature responsive circuit portion includes a second transistor identical to said first mentioned transistor, said second transistor having its base and emitter connected in series with said resistive portion.

5. An improved temperature control circuit according to claim 4, further including a resistor connected between said sensor portion and said base electrode of said first-mentioned transistor and a resistor, identical to said first-mentioned resistor, connected to form a series circuit with said resistive portion and the base and collector electrodes of said second transistor.

* * * * *

UNITED STATES PATENT AND TRADEMARK OFFICE
CERTIFICATE OF CORRECTION

PATENT NO. : 5,057,669
DATED : October 15, 1991
INVENTOR(S) : Richard L. Dennison It is certified that error appears in the above-indentified patent and that said Letters Patent is hereby corrected as shown below:

Column 5, line 39, after "to" insert -- conductor 26 and its base electrode connected to --.

Col. 7, line 4, correct "noval" to read -- novel --.

Signed and Sealed this

Twelfth Day of October, 1993

Attest:

BRUCE LEHMAN

*Attesting Officer*     *Commissioner of Patents and Trademarks*